US012231430B2

(12) United States Patent
Woo et al.

(10) Patent No.: US 12,231,430 B2
(45) Date of Patent: Feb. 18, 2025

(54) CLOUD SERVICE ARTIFACT TOKENS

(71) Applicant: MICROSOFT TECHNOLOGY LICENSING, LLC, Redmond, WA (US)

(72) Inventors: Wei-ting Timothy Woo, Kirkland, WA (US); Vladimir Fesich, Newcastle, WA (US); Seshadri Mani, Redmond, WA (US); Jeffrey Lamar McDowell, Redmond, WA (US); Naresh Kannan, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 534 days.

(21) Appl. No.: 17/512,621

(22) Filed: Oct. 27, 2021

(65) Prior Publication Data

US 2023/0127695 A1  Apr. 27, 2023

(51) Int. Cl.
*H04L 9/40* (2022.01)
*G06Q 10/1093* (2023.01)
*H04L 67/10* (2022.01)

(52) U.S. Cl.
CPC ....... *H04L 63/101* (2013.01); *G06Q 10/1095* (2013.01); *H04L 63/0807* (2013.01); *H04L 63/0884* (2013.01); *H04L 63/10* (2013.01); *H04L 63/108* (2013.01); *H04L 67/10* (2013.01)

(58) Field of Classification Search
CPC ... H04L 63/0884; H04L 63/10; H04L 63/101; H04L 63/108; H04L 9/3213; H04L 63/0807
See application file for complete search history.

(56) References Cited

U.S. PATENT DOCUMENTS

| 9,497,184 | B2 | 11/2016 | Fork et al. | |
|---|---|---|---|---|
| 10,176,335 | B2 * | 1/2019 | Adams | H04L 63/0815 |
| 10,325,089 | B2 * | 6/2019 | Sondhi | H04L 63/0807 |

(Continued)

OTHER PUBLICATIONS

"International Search Report and Written Opinion Issued in PCT Application No. PCT/US22/041138", Mailed Date: Dec. 6, 2022, 12 Pages.

(Continued)

*Primary Examiner* — Yonas A Bayou
(74) *Attorney, Agent, or Firm* — David Foster; Newport IP, LLC

(57) ABSTRACT

The techniques disclosed herein enable applications to seamlessly consume cloud-based services while minimizing exposure to security vulnerabilities. Specifically, an application is enabled to access a cloud service on behalf of a user without the user's active user token. Access is granted in a way that does not also grant access to any other user's cloud service. In some configurations, during an active user session, an artifact token is generated that caches the user's permissions. The artifact token may later be redeemed to gain access to the user's cloud service. For example, an application may request that a cloud service generate an artifact token. The request may be in response to a user scheduling the application to perform a task that depends on the cloud service. When the scheduled task is performed, the application may redeem the artifact token to access the user's cloud service.

18 Claims, 15 Drawing Sheets

(56) References Cited

U.S. PATENT DOCUMENTS

| | | | |
|---|---|---|---|
| 10,592,978 B1 | 3/2020 | Vaystikh et al. | |
| 10,621,329 B2* | 4/2020 | Sondhi | H04W 12/068 |
| 10,659,443 B2 | 5/2020 | Ahmed | |
| 10,749,854 B2* | 8/2020 | Doitch | H04W 12/06 |
| 10,754,941 B2 | 8/2020 | Angal | |
| 11,062,016 B2* | 7/2021 | Kerai | G06F 21/6227 |
| 11,151,253 B1* | 10/2021 | Hanafee | H04L 63/0823 |
| 2016/0142408 A1* | 5/2016 | Raepple | H04L 63/0807 726/9 |
| 2017/0331832 A1* | 11/2017 | Lander | H04L 63/102 |

OTHER PUBLICATIONS

"API Access Management with Okta", Retrieved from: https://developer.okta.com/docs/concepts/api-access-management/#tokens-and-scopes, Jan. 25, 2020, 9 Pages.

"Get access without a user", Retrieved from: https://docs.microsoft.com/en-us/graph/auth-v2-service, Jul. 8, 2021, 10 Pages.

"Google Sign-In for server-side apps", Retrieved from: https://developers.google.com/identity/signin/web/server-side-flow, Mar. 26, 2015, 4 Pages.

"Implementing the client credentials grant type", Retrieved from: https://cloud.google.com/apigee/docs/api-platform/security/oauth/oauth-20-client-credentials-grant-type, Jul. 23, 2021, 6 Pages.

"Server Administration Guide", Retrieved from: https://www.keycloak.org/docs/latest/server_admin/, Dec. 16, 2017, 113 Pages.

* cited by examiner

CLOUD SERVICE ARTIFACT TOKENS

BACKGROUND

Computing applications are increasingly cloud-based. Cloud-based applications utilize storage, compute, identity, and other cloud services. Cloud services have several advantages, including practically unlimited capacity, built-in storage redundancy, and accessibility from any device. However, there are many challenges to integrating cloud services into an application, such as managing the permissions needed to access cloud services.

Cloud services are hosted in data centers that are simultaneously accessed by many different users and organizations. Access controls ensure that users are only able to access the cloud services they have been granted access to. One type of access control stores permissions in user tokens that may be redeemed by an authorization module to gain access to a cloud service.

In order to mitigate unauthorized access, user tokens expire after a defined period of time. For example, a user token may be valid for an hour, after which it expires. Any attempt to access a cloud service with an expired token will be rejected by an authorization module of the cloud service. User tokens may be automatically renewed if a user remains logged into their computer. However, after a user logs off their computer, a user token will expire, securing access to the user's cloud services.

There are scenarios in which a user would like to grant an application the ability to use a cloud service after the user's token has expired. For example, a user may schedule an online meeting for some time in the future. The user may also request that a recording of the meeting be stored in the user's cloud storage folder. If the user does not attend the meeting, then the meeting application may not have an active user token with which to access the user's cloud storage folder. Without an active user token, the application conducting the meeting may not be able to store the recording in the user's cloud storage folder.

There are existing techniques that enable the meeting application to access the user's cloud storage folder without an active user token. For example, the cloud storage service may grant the meeting application access to every user's cloud storage folder—including the user who scheduled the meeting. However, this approach violates the principle of least privilege, and is considered a security vulnerability. For example, if a hacker gained access to the application hosting the meeting, the hacker would be able to access any user's cloud storage folder.

It is with respect to these technical issues and others that the present disclosure is made.

SUMMARY

The techniques disclosed herein enable applications to seamlessly consume cloud-based services while minimizing exposure to security vulnerabilities. Specifically, an application is enabled to access a cloud service on behalf of a user but without the user's active user token. Access is granted in a way that does not also grant access to any other user's cloud service. In some configurations, during an active user session, an artifact token is generated that caches the user's permissions. The artifact token may later be redeemed to gain access to the user's cloud service. For example, an application may request that a cloud service generate an artifact token. The request may be in response to a user scheduling the application to perform a task that depends on the cloud service. When the scheduled task is performed, the application may redeem the artifact token to access the user's cloud service.

A user token encapsulates a user's identity and permissions that the user has been granted. For example, a user token may grant permission to upload a file to a user's cloud storage folder. In some configurations, an application obtains a user token when a user logs into the application. The token may be obtained from a secure token server that authenticates the user's identity. Having an active user token is an indication that the user logged in successfully and that the user is interacting with the application. When accessing a cloud service on behalf of a user, an application may use an active user token if one is available. However, if an active user token is not available, the application may use an artifact token to access the cloud service on behalf of the user.

The application itself may also be associated with a token. An application token lists permissions granted to the application. Permissions granted to an application tend to be more comprehensive than permissions granted to a particular user. For example, a user token may grant permission to read data from a particular user's cloud storage folder while an application token may grant permission to read data from any user's cloud storage folder.

When invoking a cloud service on behalf of the user, an authorization technique referred to as "application plus user authorization" may be used. With this technique, the application may provide the active user token and the application token to an authorization module of the cloud service. The authorization module may compute an intersection of permissions granted to the user and permissions granted to the application. The authorization module may then determine to allow the requested operation by determining from the intersection of the permissions that both the application token and the user token have been granted the privileges needed to perform the requested operation. "Application plus user authorization" is a common authorization technique.

For example, a user schedules a meeting using a meeting application such as Microsoft Teams®. The scheduling user may setup the meeting to be automatically recorded, and for the meeting application to automatically upload the recording to the scheduling user's cloud storage folder. If the scheduling user participates in the meeting, the meeting application will have an active user token for the scheduling user. When the meeting concludes, the meeting application will redeem the scheduling user's active user token and the meeting application token with the authorization module of the cloud storage service. If the scheduling user and the meeting application both have permission to write to the scheduling user's cloud storage folder, then the authorization module will authorize the meeting application to upload the recording. If either token does not have permission to write to the scheduling user's cloud storage folder, the upload will fail.

However, this technique requires that the messaging application has access to the scheduling user's active user token. Continuing the example, if the scheduling user did not actually participate in the meeting, then the meeting application would not have the scheduling user's active user token. The meeting application may have active user tokens from actual meeting participants, but none of these tokens will have permission to write to the scheduling user's cloud storage folder.

Previous solutions have addressed this problem by allowing the permissions of the application token alone to determine whether an operation is allowed—i.e. not requiring that a user token also have permission to perform the requested operation. In this way, the application is enabled to access a particular user's cloud service because the application is enabled to access every user's cloud service. As discussed above, this solution grants more permissions than are necessary to access the cloud storage folder of a particular user, increasing the severity of any security vulnerability in the application.

In some embodiments, an application is able to access a user's cloud service without an active user token by caching permissions until they are needed. The permissions may be cached in an artifact token generated by the cloud service authorization module. The permissions cached in the artifact token may be extracted from an active user token provided by the application. By only caching permissions extracted from an active user token, the artifact token does not enable access to the cloud services of other users. This limits the exposure of sensitive data in the event of a security breach compared to solutions that grant the application access to every user's cloud services.

The application may store the artifact token until the cached permissions are needed. At that time, the application may use the authorization module to redeem the artifact token, gaining access to the user's cloud service. The authorization module may determine whether to redeem the artifact token based on an allow-list that indicates which applications and for which artifacts access is allowed.

In some configurations, the application or the authorization module of the cloud service may place restrictions on when an artifact token may be redeemed. For example, the artifact token may be restricted for use by a specific application—such as the application that requested the artifact token. The artifact token may also be restricted for use by a particular scenario of an application, and/or for certain dates or times.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1A:
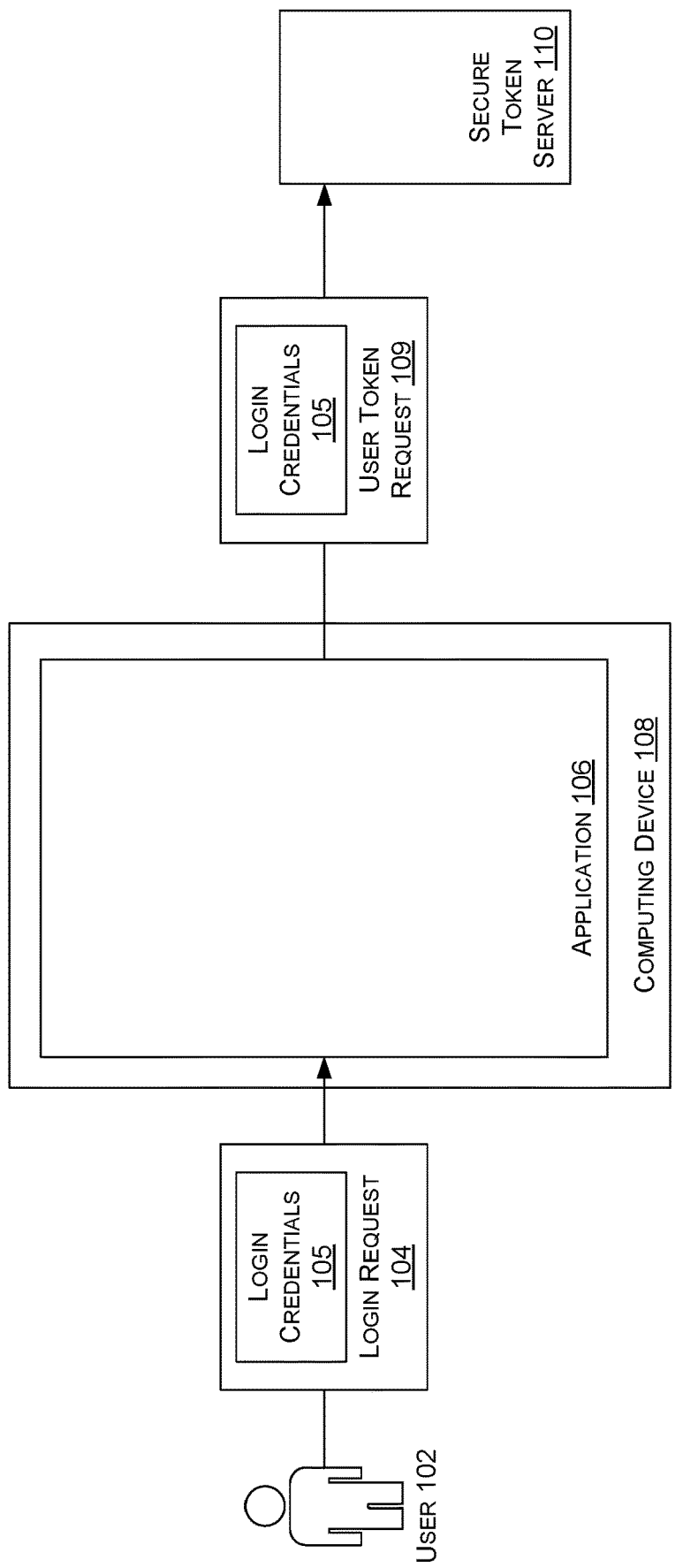
FIG. 1A illustrates a first part of a login procedure.

FIG. 1A illustrates a first part of a login procedure. As illustrated, user 102 provides login request 104 to application 106. Application 106 is running on computing device 108, which may be any computer, tablet, smartphone, wearable, vehicle, or other computing device. Application 106 may be a productivity application, collaboration application, game, web browser, "app", or any other type of software. Application 106 may be a stand-alone application or a client application that works in concert with a server-based application backend. Login request 104 may include login credentials 105 provided by user 102, such as a password, biometric information, or some other secret attributable to user 102.

In the process of performing the login request 104, application 106 uses secure token server 110 to authenticate login credentials 105. Secure token server 110 is responsible for issuing, validating, renewing and cancelling security tokens. Examples of secure token server 110 include Microsoft Active Directory, Azure Active Directory, or the like. As illustrated, application 106 submits user token request 109 containing login credentials 105 to secure token server 110.

Figure 1B:
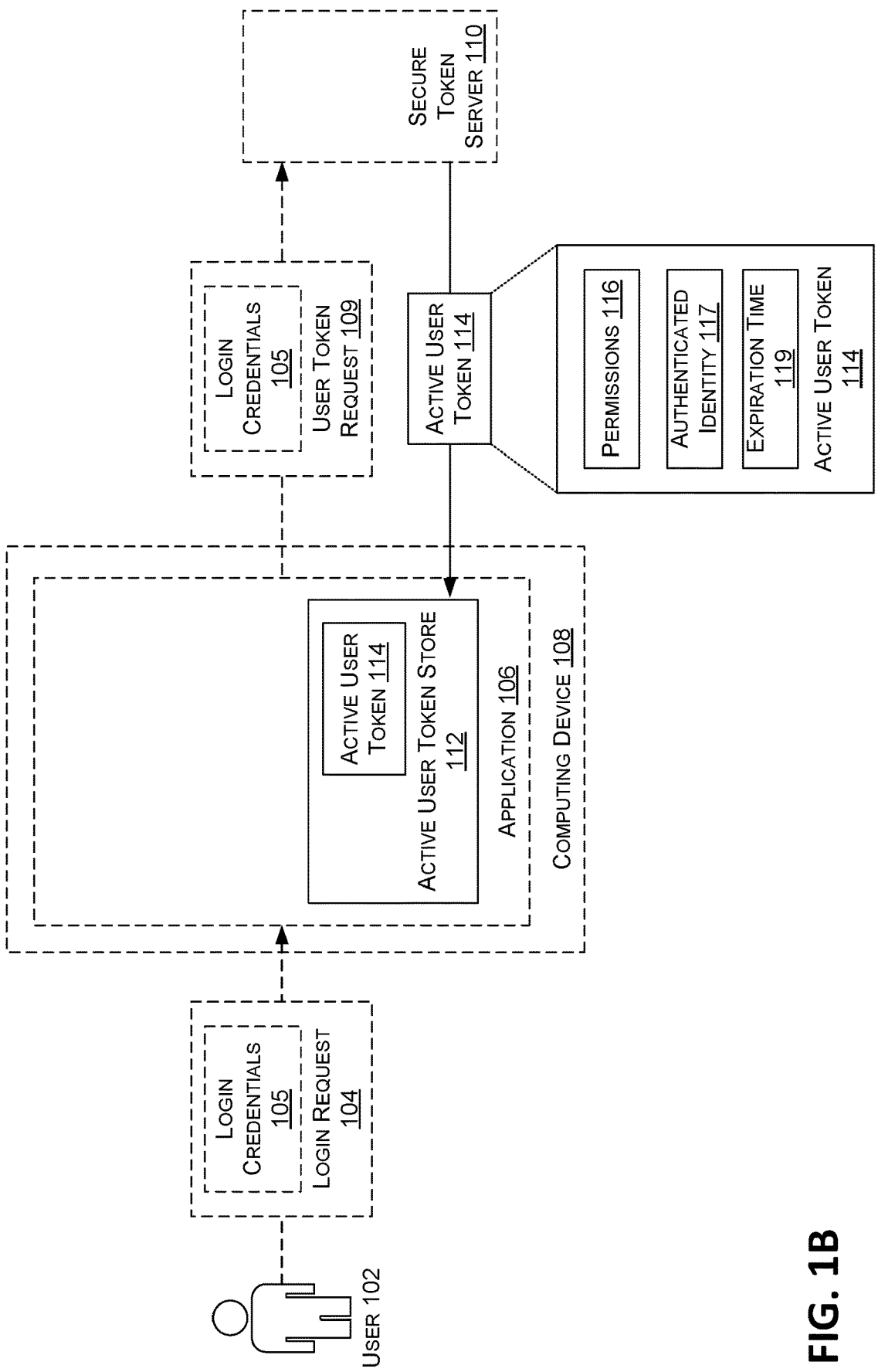
FIG. 1B illustrates a second part of a login procedure.

FIG. 1B illustrates a second part of a login procedure. Secure token server 110 authenticates the identity of user 102 from login credentials 105. If user 102 can be authenticated, secure token server 110 generates active user token 114. Active user token 114 may include the authenticated identity 117 of user 102. Active user token 114 may also include permissions 116 granted to user 102. Permissions 116 may indicate the cloud service operations that user 102 is authorized to access. In some configurations, active user token 114 includes an expiration time 119 indicating a time at which active user token 114 will no longer be usable to invoke an operation of a cloud service. Active user token 114 may be cryptographically signed by secure token server 110 so that the authenticity of active user token 114 may later be validated.

Secure token server 110 responds to user token request 109 by returning active user token 114 to application 106. Application 106 stores active user token 114 in active user token store 112. As discussed herein, application 106 may use active user token 114 to invoke a cloud service on behalf of user 102.

Active user token 114 may expire after a defined amount a time. For example, active user token 114 may be valid for one hour after it is issued. The actual expiration time may be stored in expiration time 119. Once it has expired, active user token 114 may no longer be used to invoke the cloud service on behalf of user 102. If user 102 is still logged into application 106 when active user token 114 expires, application 106 may renew active user token 114 or replace it with a new, equivalent active user token. However, once user 102 logs off of application 106, active user token 114 will remain usable only until it expires. In some configurations, application 106 continues running after user 102 logs off, in which case application 106 may continue to use active user token 114 until it expires.

Figure 2A:
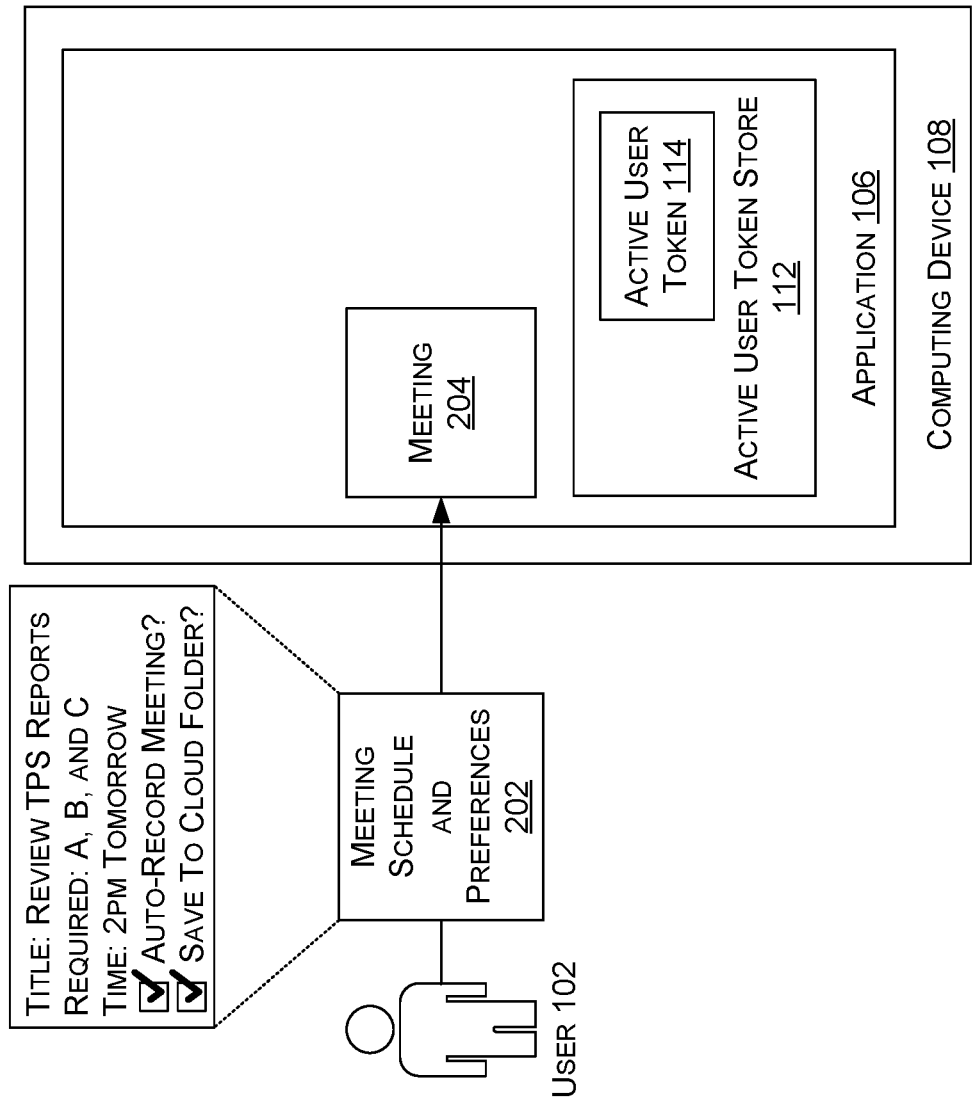
FIG. 2A illustrates a user setting up a meeting to be automatically recorded and saved to the user's cloud storage folder.

FIG. 2A illustrates a user setting up a meeting to be automatically recorded and uploaded to the user's cloud storage folder. This is one example of a user scheduling or otherwise causing an application to perform a scenario in the future. If the application does not have the user's unexpired active user token when the scenario is scheduled to be performed, the application may be unable to invoke an operation of a cloud service while performing the scenario.

As illustrated, user 102 submits meeting schedule and preferences 202 to meeting 204. Meeting schedule and preferences 202 depicts a meeting scheduled for 2:00 PM tomorrow. Users A, B, and C are asked to attend. The meeting is configured to be automatically recorded, and the recording will be automatically uploaded to the scheduling user's cloud storage folder.

As illustrated, meeting 204 is scheduled using application 106 of computing device 108. Examples of application 106 include Microsoft Outlook, Microsoft Teams, and other collaboration applications that run on a client device. Application 106 may also be a web application running in a browser, such as Google Calendar or a web-based version of Microsoft Teams. Application 106 may be a stand-alone application, or application 106 may work in concert with other client applications or with server-based applications.

Meeting 204 is an example of a scenario. As used herein, the term 'scenario' refers to a feature, action, or other functionality of an application. Examples include a collaboration session, synchronizing a client with a server, spell-checking a document, or the like. An artifact token refers to a token that may only be redeemed while the application performs a particular scenario. As illustrated, an artifact token associated with meeting 204 may only be redeemed to authorize cloud service operations that facilitate meeting 204. Another example of a scenario is an email client synchronizing a user's inbox with an email server. An artifact token associated with the mailbox synchronization scenario may only be redeemed while the client email application is syncing with the email server.

Figure 2B:
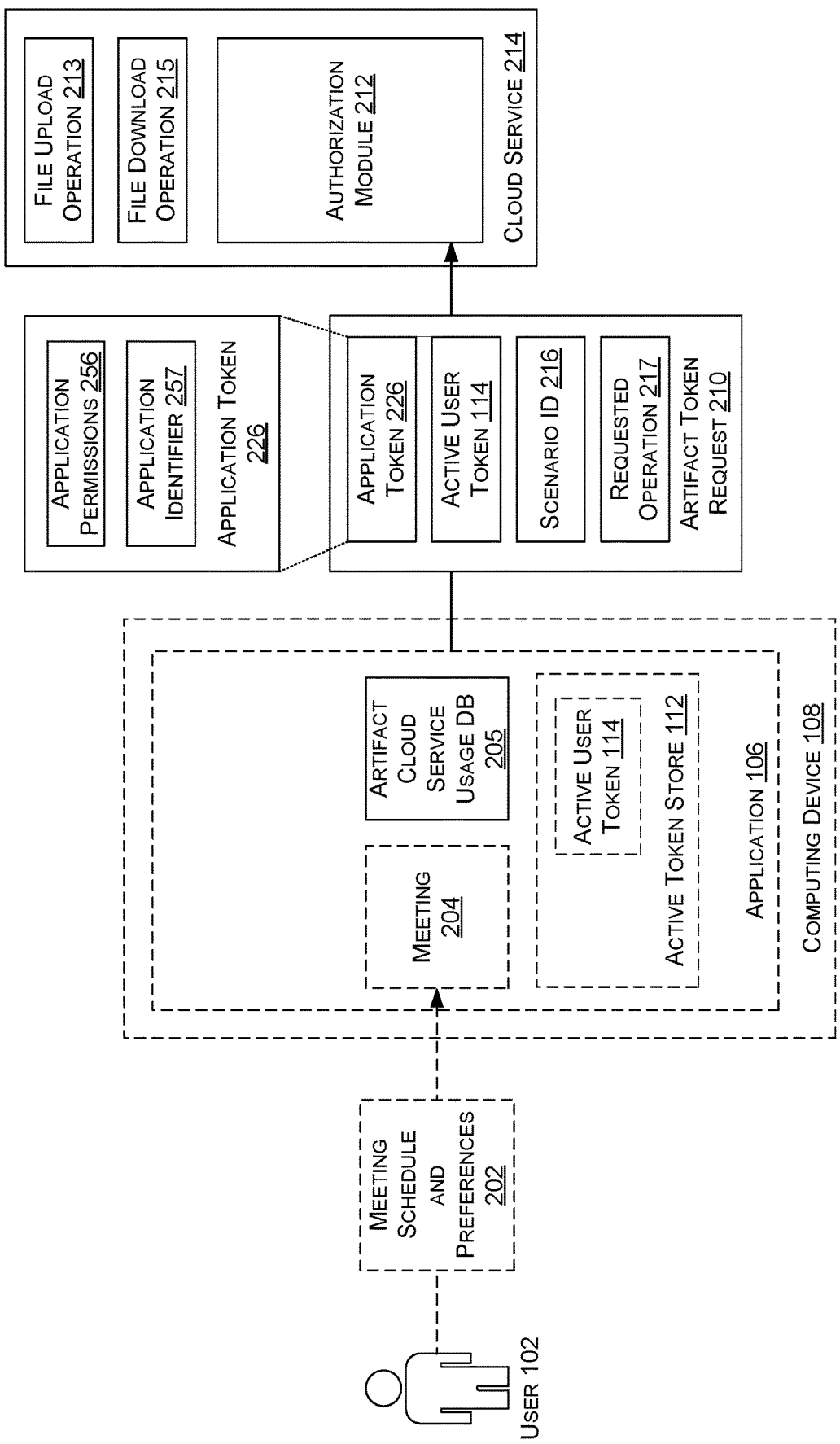
FIG. 2B illustrates an application requesting that a cloud service generate an artifact token.

FIG. 2B illustrates an application requesting that a cloud service generate an artifact token. In some configurations, application 106 submits artifact token request 210 to authorization module 212 of cloud service 214. Application 106 may submit artifact token request 210 in order to cache permissions used by meeting 204. In this way if active user token 114 expires, application 106 may use the cached permissions to invoke operation 217. As referred to herein, a cloud service operation, or "operation" refers to an application program interface (API) made available by a cloud service.

Artifact token request 210 may include active user token 114, application token 226, scenario identifier 216, and requested operation 217. Application token 226 may include application identifier 257 and application permissions 256. Application identifier 257 may be a serial number, globally unique identifier, name, or other symbol used to identity application 106. Permissions 256 may include a set of operations of cloud service 214 that application 106 is allowed to invoke—typically broader permissions than would be granted to a particular user. Artifact identifier 216 identifies a scenario of application 106, such as meeting 204. The artifact token generated by cloud service 214 may be limited to operations made while executing meeting 204. Request operation 217 may identify an operation of cloud service 214 such as file upload operation 213 or file download operation 215.

FIG. 2B illustrates just one example of how application 106 may obtain an artifact token. Application 106 may also submit artifact token request 210 to an artifact token server independent of cloud service 214. FIG. 2B also illustrates just one example of a scenario—meeting 204—that may need user permissions to be completed. Other examples of scenarios that are scheduled for the future include periodic file backups, auto-forwarding an email, or any other aspect of an application that may be performed when the user is not logged in.

Figure 2C:
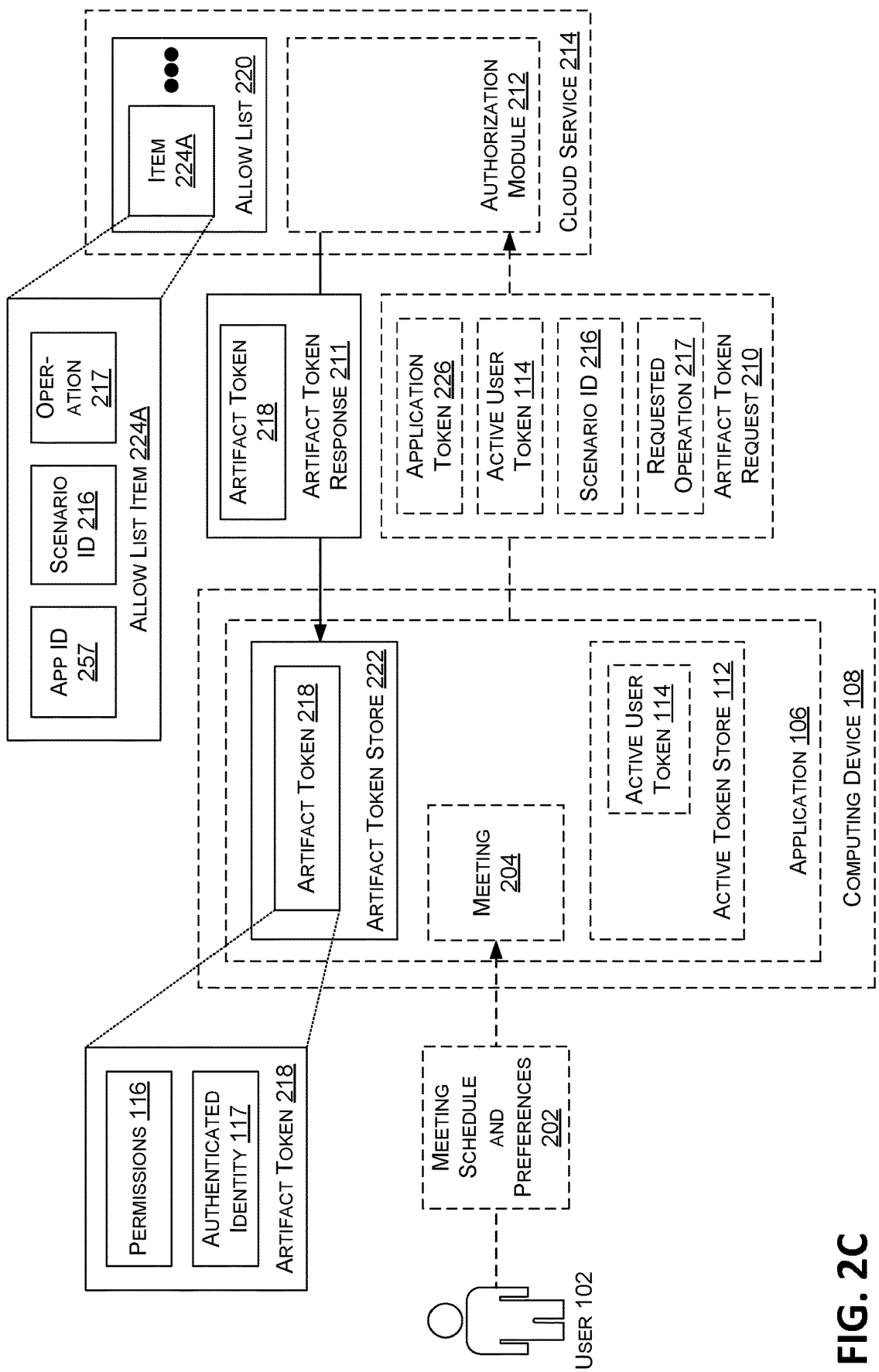
FIG. 2C illustrates a cloud service generating, storing, and returning the requested artifact token.

FIG. 2C illustrates a cloud service generating, storing, and returning the requested artifact token. As illustrated, authorization module 212 receives artifact token request 210. Before generating an artifact token 218, authorization module 212 verifies that user 102 and application 106 have permission to invoke requested operation 217. For example, authorization module 212 may compute an intersection of the permissions granted to user 102 and the permissions granted to application 106. If the intersection of the permissions includes permission to perform the requested operation 217, then authorization module 212 will generate artifact token 218. If either user 102 or application 106 does not have permission to perform the requested operation, artifact token request 210 may be rejected.

In some configurations, authorization module 212 may restrict which applications an artifact token may be created for—even if user 102 and application 106 have permission to perform the scenario. For example, authorization module 212 may allow artifact token 218 to be generated if allow list 220 includes an allow list item 224 with operation 217, scenario identifier 216, and the application identifier 257 of application token 226.

Artifact token 218 may include authenticated identity 117 of user 102 and as many of permissions 116 as are needed to perform the requested operation 217. Cloud authorization module 212 may also return artifact token 218 as part of artifact token response 211. Artifact token response 211 may be received by application 106, where it is stored in artifact token store 222.

Figure 2D:
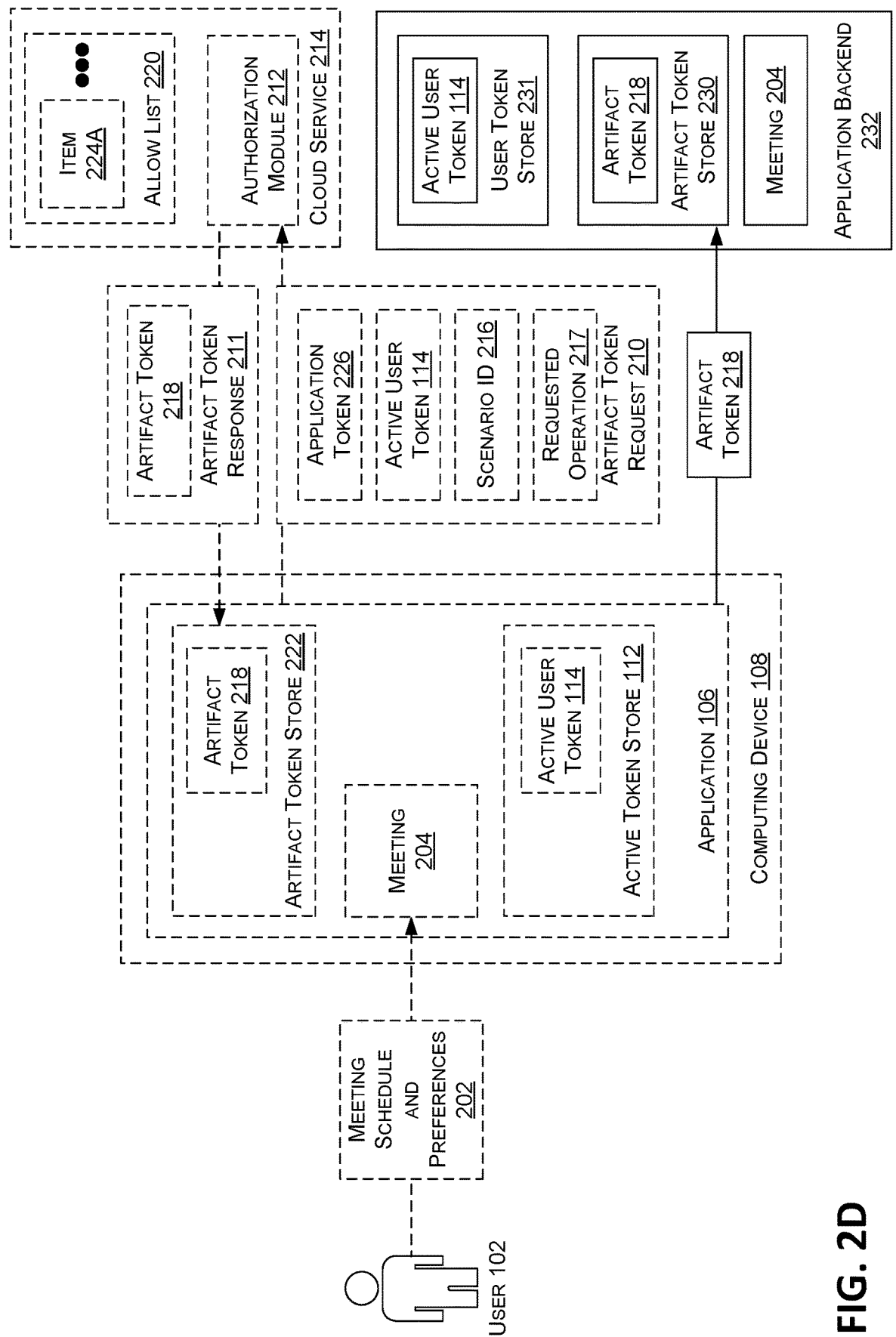
FIG. 2D illustrates the application caching the artifact token in the application's backend.

FIG. 2D illustrates the application caching the artifact token in the application's backend. Application backend 232 may be a server-hosted counterpart of application 106. For example, application 106 may be a Microsoft Teams client application and application backend 232 may be a Microsoft Teams server application. The Teams client application may communicate with the Teams server application to facilitate meeting 204 among other features such as chat, video calls, file sharing, and the like. In some configurations, application 106 and application backend 232 are combined into a single application. In some configurations, application 106 and application backend 232 operate on the same computing device.

In some configurations, application 106 provides active user token 114 to application backend 232 where it is stored in user token store 231. In this way, application backend 232 may use active user token 114 to access cloud services on behalf of user 102. However, as discussed above, active user token 114 will expire after a defined period of time, after which application backend 232 will no longer be able to access cloud services on behalf of user 102. For example, if user 102 logs off of application 106, active user token 114 may have expired by the time meeting 204 takes place. If user 102 has not logged back in before meeting 204 begins, application backend 232 will not be able to access cloud services on behalf of user 102.

As discussed above in conjunction with FIG. 2C, application 106 caches permissions extracted from active user token 114 in artifact token 218. In this way, application 232 has permission to access cloud service 214 on behalf of user 102 during meeting 204. In some configurations, application 106 provides artifact token 218 to application backend 232, where it is stored in artifact token store 230. In this way, application backend 232 may use artifact token 218 to operate on behalf of user 102 during meeting 204 if active user token 114 has expired. For example, application backend 232 may use artifact token 218 to access file upload operation 213 on behalf of user 102 in order to upload a recording of meeting 204. While FIG. 2D illustrates application 106 receiving artifact token 218, storing it, and providing it to application backend 232, it is also contemplated that authorization module 212 may provide artifact token 218 directly to application backend 232.

Figure 2E:
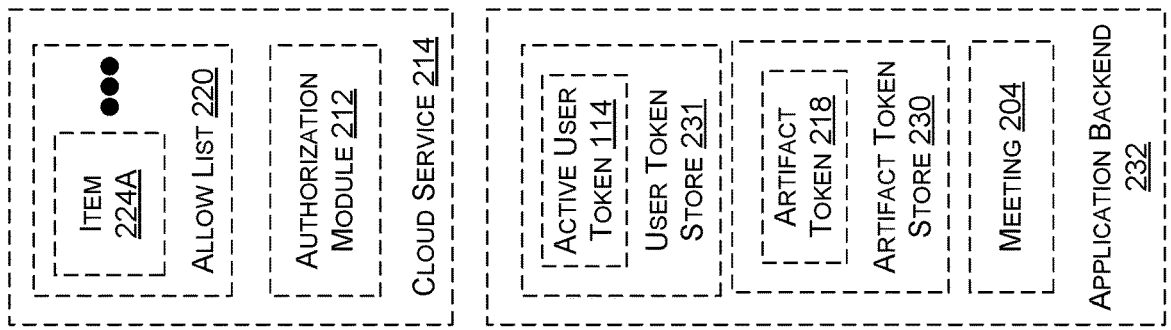
FIG. 2E illustrates the user logging off the application.
Figure 2E:
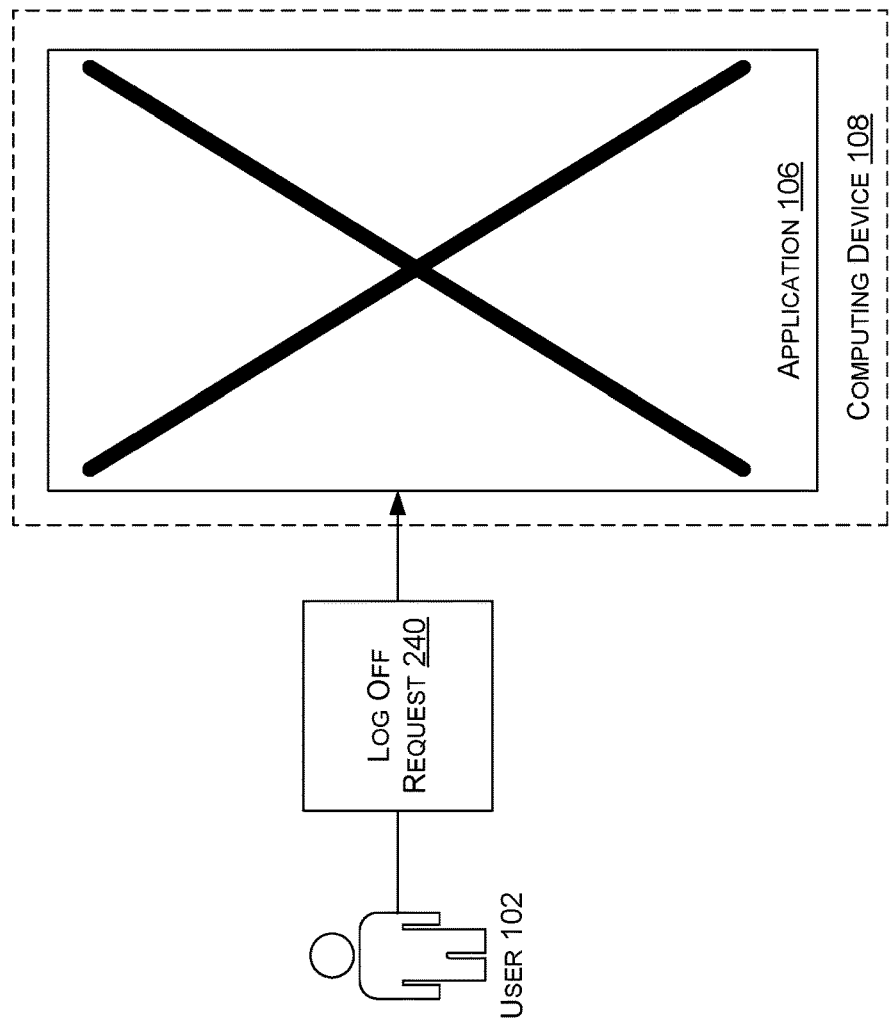

FIG. 2E illustrates the user logging off the application. As illustrated, user 102 may cause log off request 240 to be sent to application 106. In other configurations, user 102 is automatically logged off application 106 after timing out. Once user 102 has logged off application 106, active user token 114 will eventually expire. However, since application backend 232 has stored a copy of artifact token 218, meeting 204 may use artifact token 218 to access cloud service 214 on behalf of user 102.

Figure 3A:
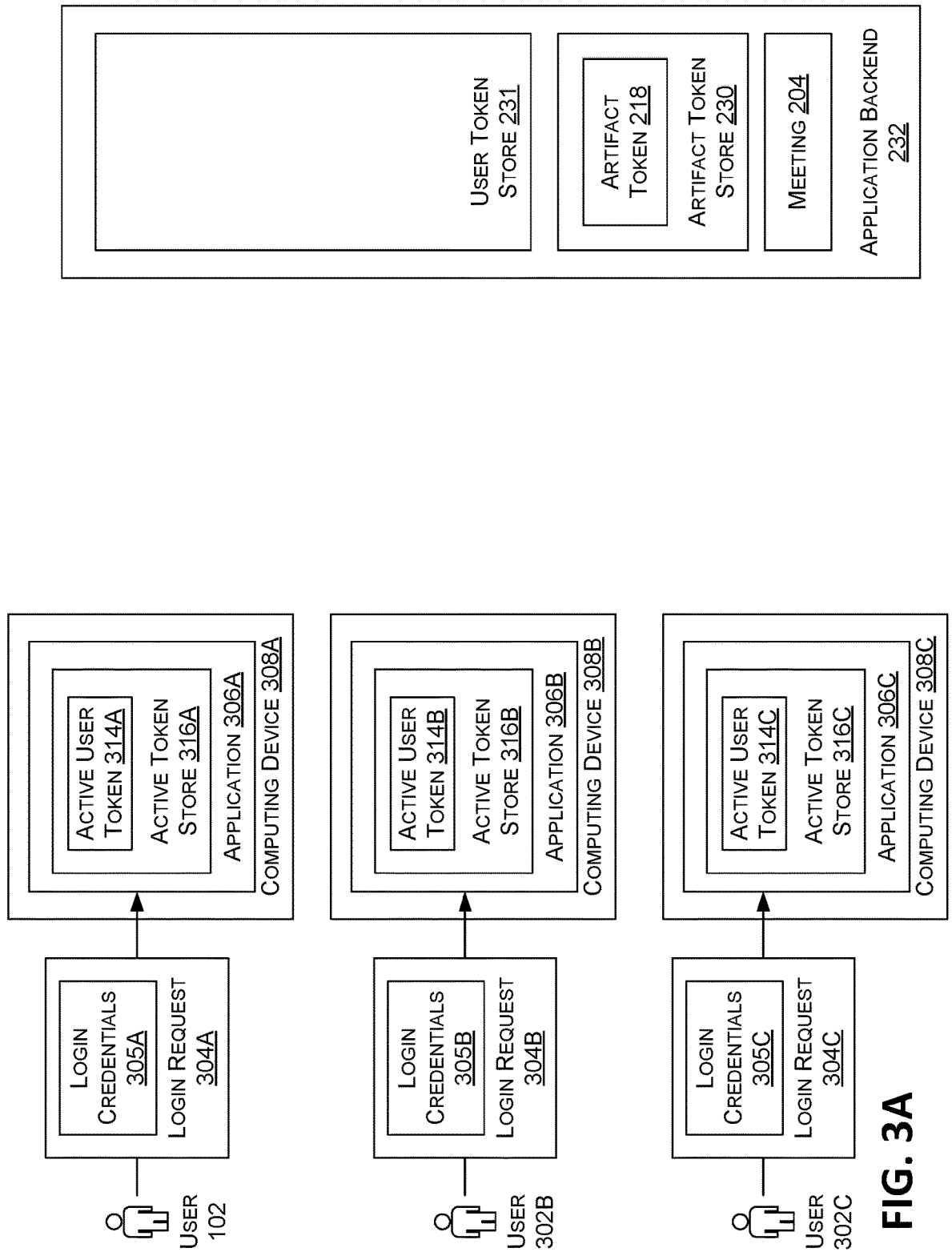
FIG. 3A illustrates the user and two other users logging into different instances of the application.

FIG. 3A illustrates the user and two other users logging into different instances of the application. This is a situation in which user 102 had logged off application 106, possibly allowing active user token 114 to expire, only to log in again to join meeting 204. User 102 logs into application 306A— which may be the same or a new instance of application 106. Specifically, user 102 provides login request 304A containing login credentials 105A to application 306A running on computing device 308A. Application 306A may use login credentials 305A to obtain active user token 314A and store it in active token store 316A. Users 302B and 302C may similarly provide login requests 304B and 304C containing login credentials 305B and 305C to applications 306B and 306C running on computing devices 308B and 308C. Applications 306B and 306C may obtain and store active user tokens 314B and 314C in active token stores 316B and 316C, respectively.

Figure 3B:
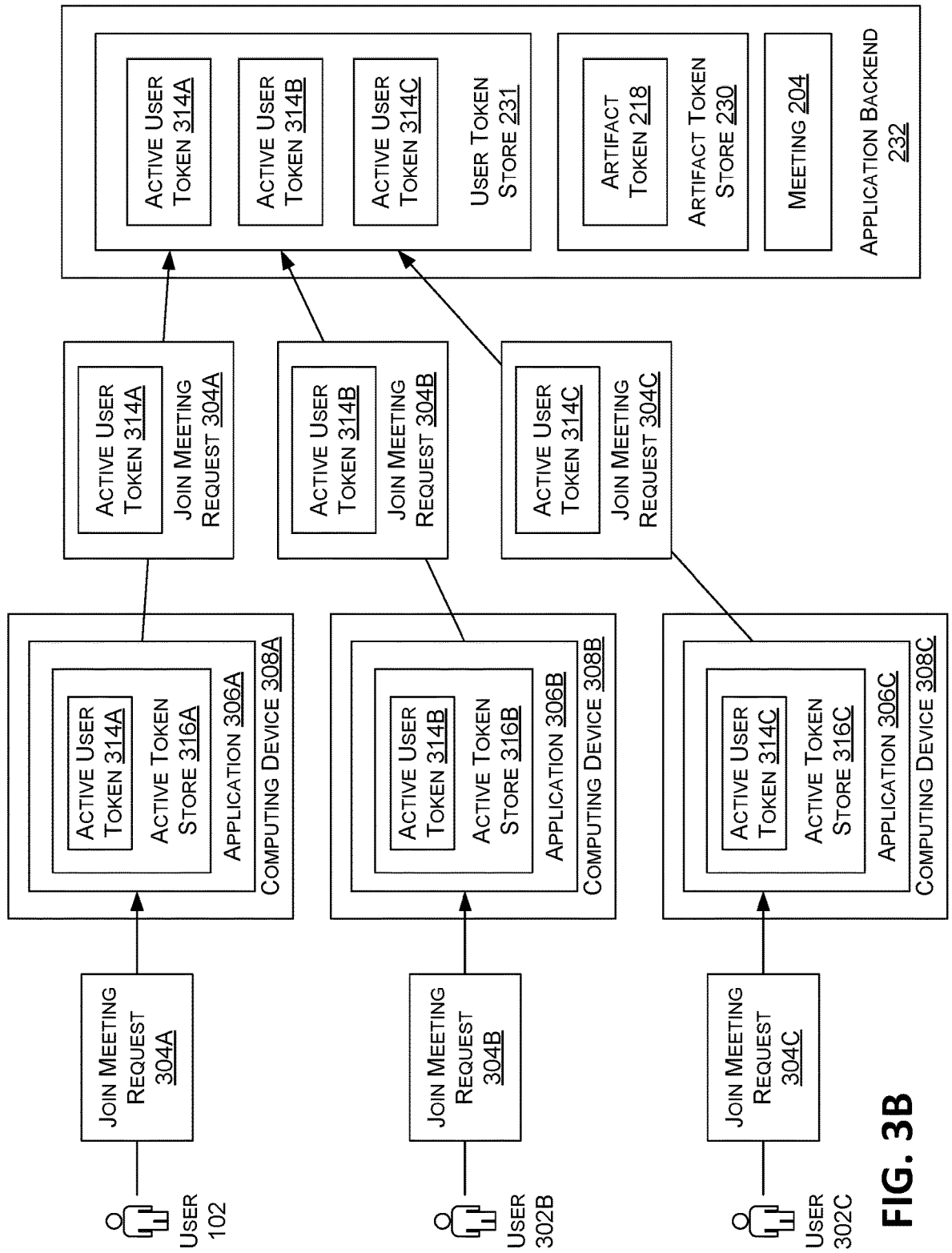
FIG. 3B illustrates the three users joining the meeting hosted by the application backend.

FIG. 3B illustrates the three users joining the meeting hosted by the application backend. As illustrated, users 102, 302B, and 302C cause applications 306A-C to send join meeting requests 304A-C to application backend 232. Application backend 232 stores active user tokens 314A-C in user token store 231, enabling application backend 232 to access cloud services on behalf of users 102, 302B, and 302C during meeting 204.

Figure 3C:
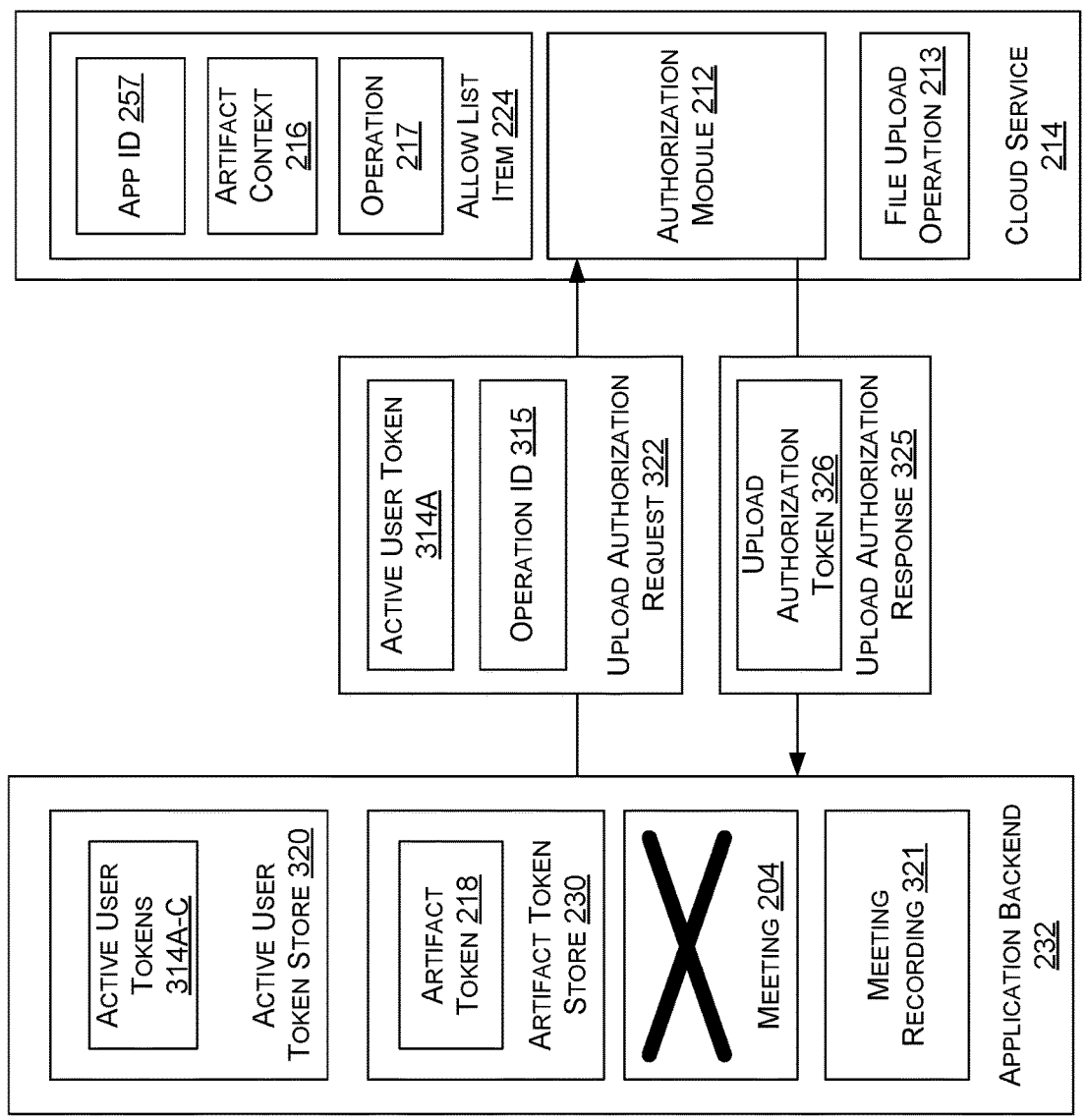
FIG. 3C illustrates the application backend requesting authorization to upload a recording of the meeting to the user's cloud storage folder.

FIG. 3C illustrates the application backend requesting authorization to upload a recording of the meeting to the user's cloud storage folder. This is an example of authorization based on an active user token. As illustrated, meeting 204 has ended, causing meeting recording 321 to be finalized. In some configurations, application backend 232 may request authorization before invoking file upload operation 213. For example, application backend 232 may submit upload authorization request 322 containing active user token 314A and operation identifier 315 to authorization module 212 of cloud service 214. Authorization module 212 may validate that active user token 314A has not expired and that it contains the permissions 116 necessary to perform the operation referred to by operation identifier 315. If these conditions are met, authorization module 212 returns upload authorization response 325 containing upload authorization token 326. In some configurations, authorization module 212 is not tied to a particular cloud service but instead authorizes access to multiple operations on multiple cloud services. In these configurations, operation identifier 315 may identify a particular operation of a particular cloud service.

Figure 3D:
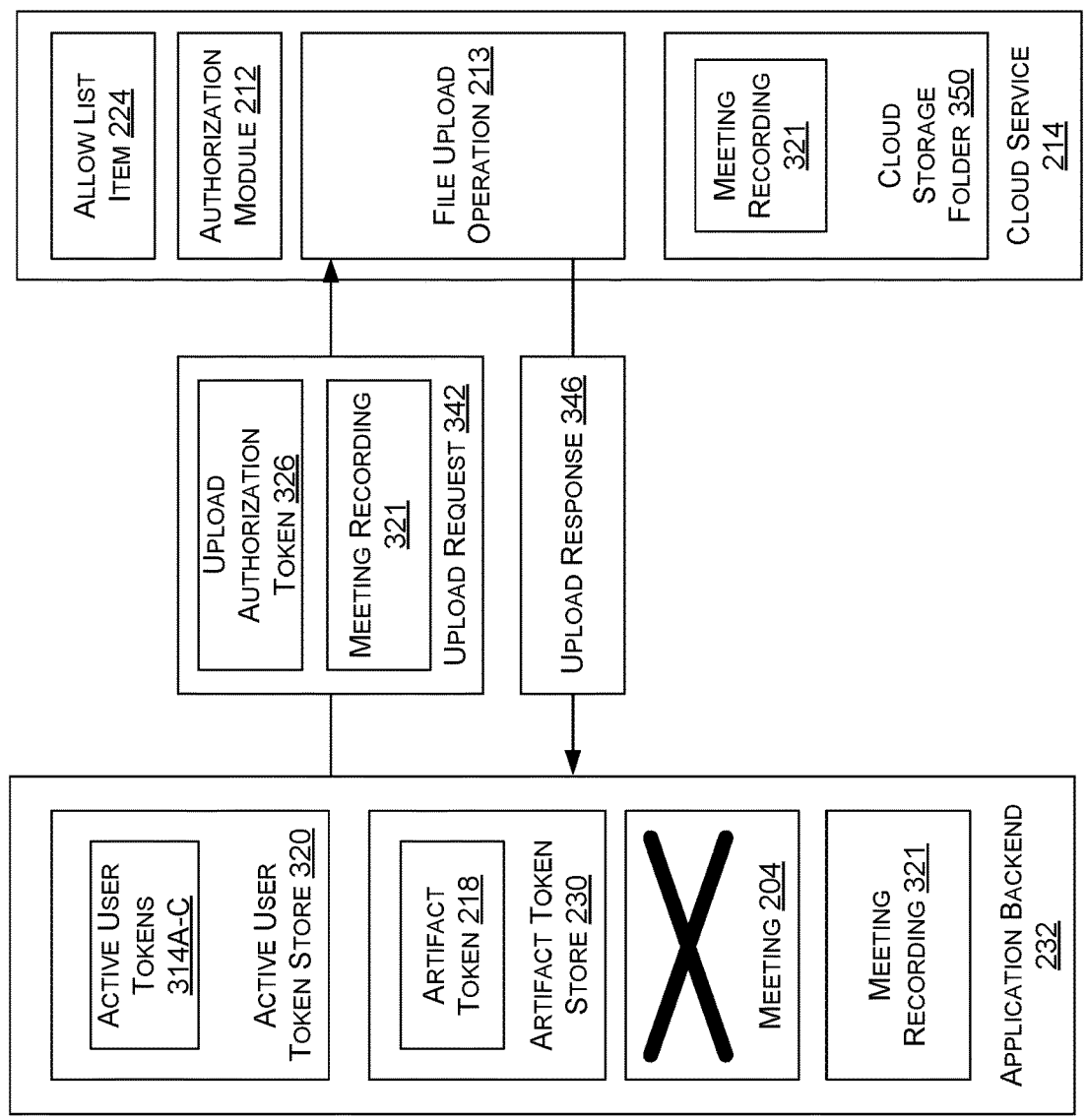
FIG. 3D illustrates the application backend uploading the recording of the meeting to the user's cloud storage folder.

FIG. 3D illustrates the application backend uploading the recording of the meeting to the user's cloud storage folder. As illustrated, application backend 232 provides upload request 342 to file upload operation 213 of cloud service 214. Upload request 342 contains upload authorization token 326 and meeting recording 321. Upload authorization token 326 authorizes the requested upload. As such, file upload operation 213 stores meeting recording 321 in cloud storage folder 350 of user 102. Upon completion or failure, file upload operation 213 may send upload response 346 to application backend 232 confirming the result.

Figure 4A:
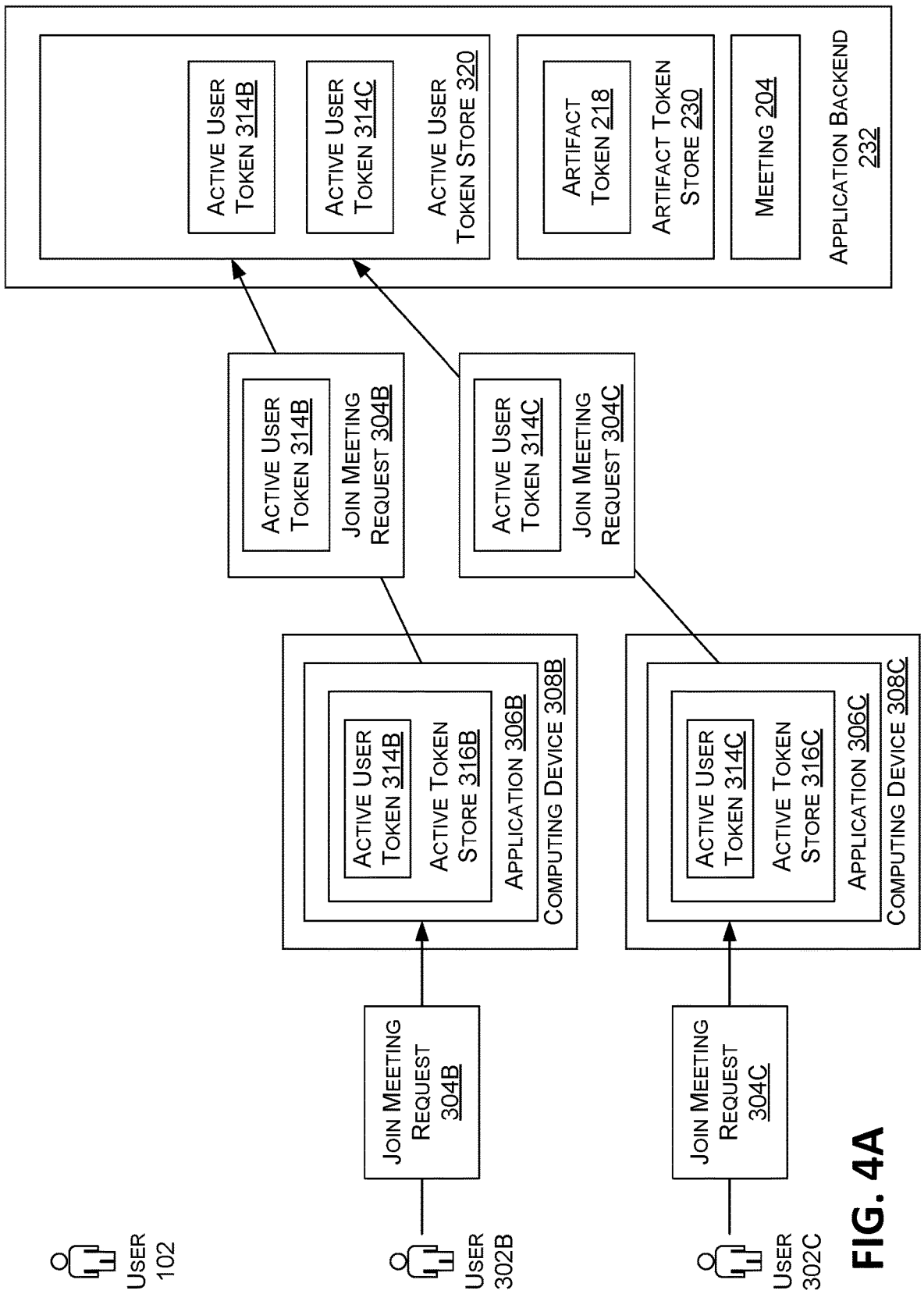
FIG. 4A illustrates two users joining the meeting hosted by the application backend.

FIG. 4A illustrates two users joining the meeting hosted by the application backend. This is an example of a scenario in which user 102 scheduled meeting 204 but is not logged in when meeting 204 takes place. Specifically, users 302B and 302C are logged in to applications 306B and 306C, as discussed above in conjunction with FIG. 3A. Users 302B and 302C also join meeting 204 as discussed above in conjunction with FIG. 3B.

Figure 4B:
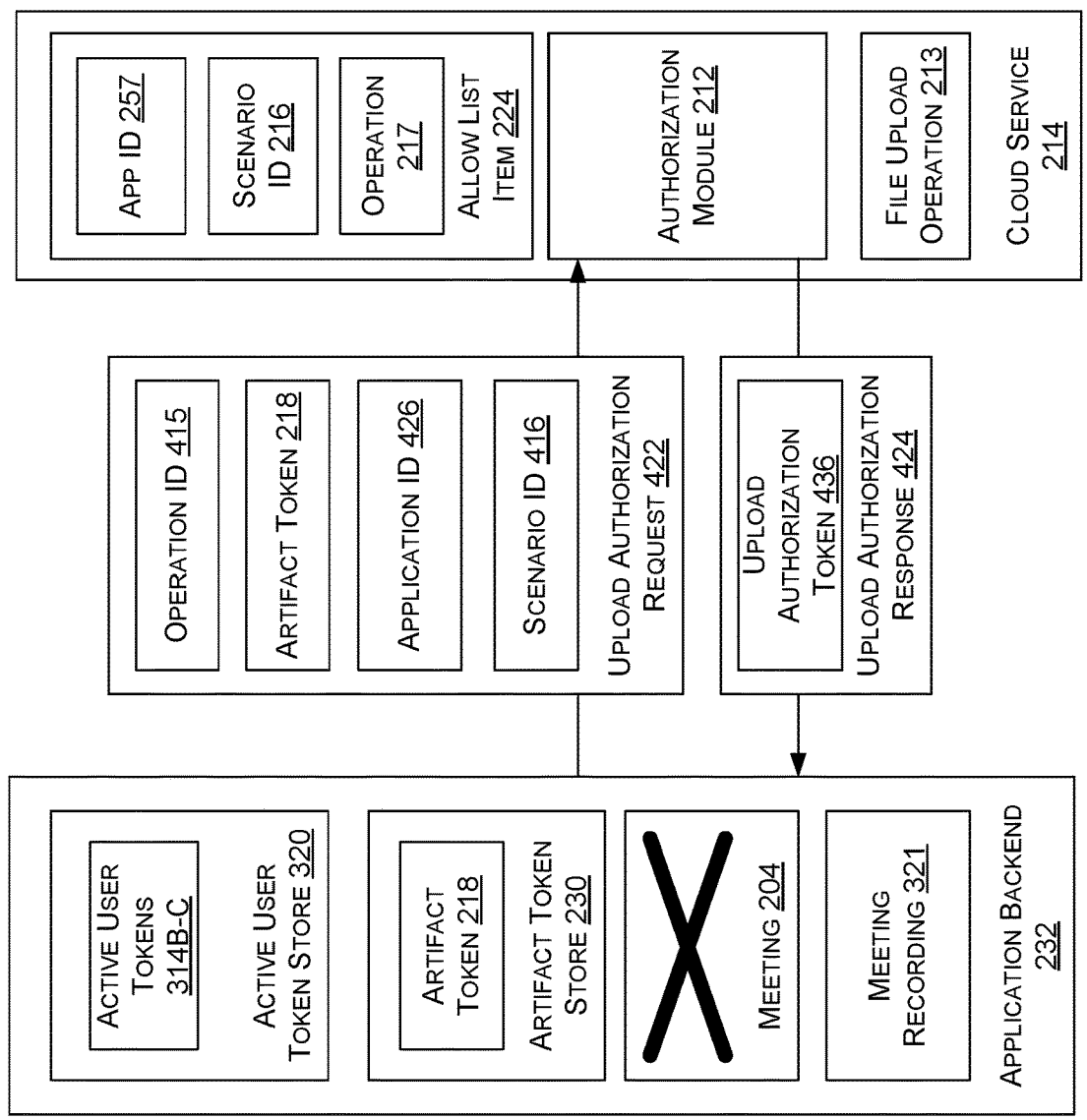
FIG. 4B illustrates the application backend requesting authorization to upload the recording of the meeting to the scheduling user's cloud storage folder.

FIG. 4B illustrates the application backend requesting authorization to upload the recording of the meeting to the scheduling user's cloud storage folder. This is a scenario in which artifact token 218 is used to authorize access to cloud service 214 on behalf of user 102. Application 106 may determine to submit an upload authorization request with artifact token 218 instead of active user token 114 based on a determination that active user token 114 is expired or otherwise unavailable. Application backend 232 may also determine to submit upload authorization request 422 with artifact token 218 in response to upload authorization request 322 failing for lack of permissions. Upload authorization request 422 may contain operation identifier 415, artifact token 218, application token 426, and scenario identifier 416. Operation identifier 415, like operation identifier 315, may identify one or more particular operations of particular cloud services. As discussed herein, artifact token 218 contains privileges granted to user 102. Application token 426 identifies the application that was used to generate artifact token 218—e.g. application 106. Scenario identifier 416 indicates a particular scenario of the identified application that upload authorization request 422 is for—e.g. meeting 204.

Authorization module 212 may determine if the combination of artifact token 218, application token 426, and scenario identifier 416 are allowed access to operation 415. In some configurations, authorization module 212 makes this determination by looking up a combination of artifact token, application identifier, and scenario identifier in allow list 220. As illustrated, authorization module 212 determines whether application identifier 426, scenario identifier 416, and operation identifier 415 match an allow list item 224 with corresponding application identifier 257, scenario identifier 216, and operation 217. If a match is found, then authorization module 212 grants authorization to invoke the requested operation. In this case, upload authorization response 424 is returned to application backend 232, including upload authorization token 436. As discussed above in conjunction with FIG. 3C, instead of authorizing an operation with a first request and invoking the operation with a second request, an operation of cloud service 214 may be authorized and invoked in the same call. If the operation 415 is authorized, application backend 232 may perform the requested operation as discussed above in conjunction with FIG. 3D.

Figure 5:
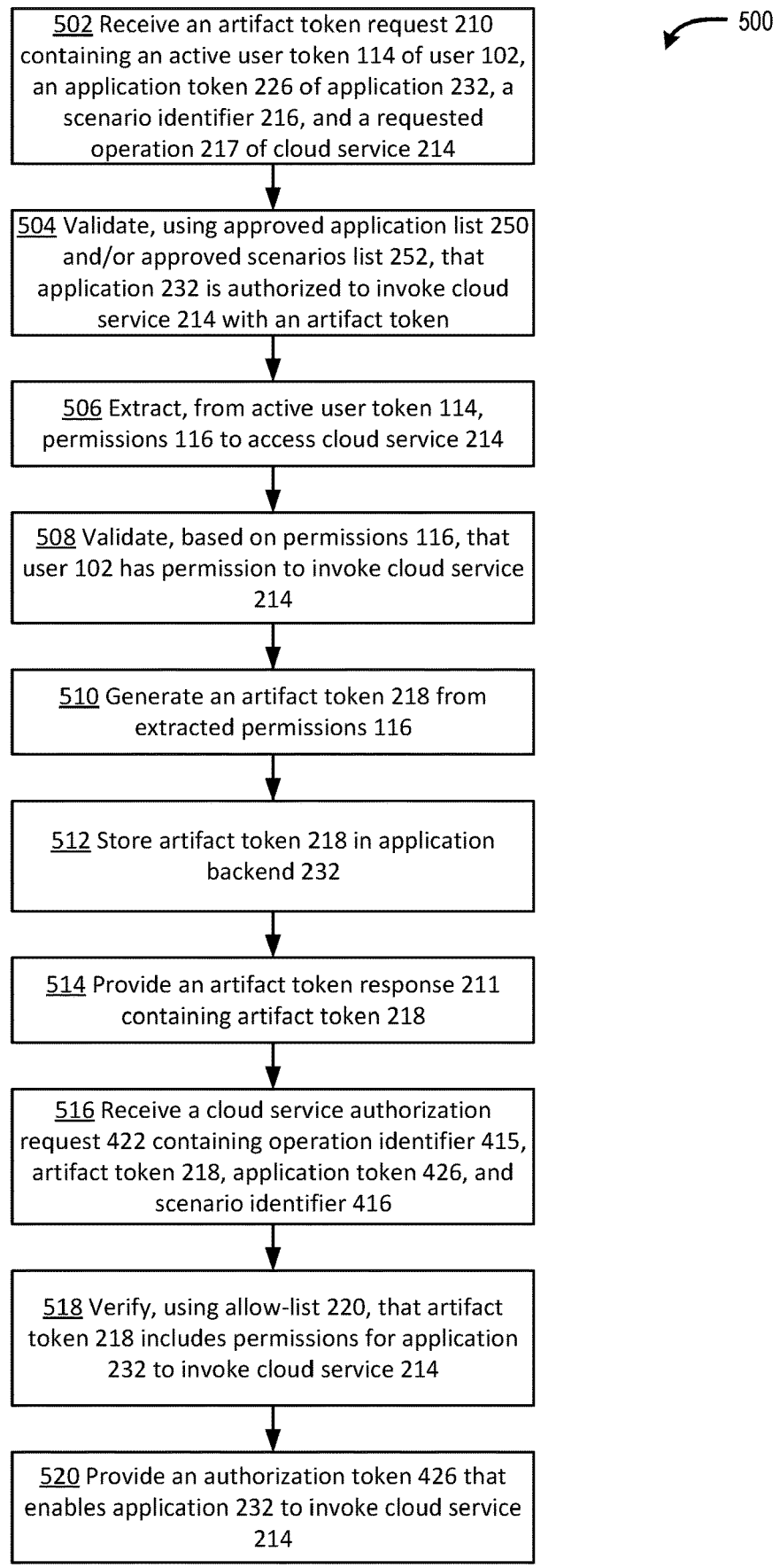
FIG. 5 is a flow diagram showing aspects of a routine for the disclosed techniques.

FIG. 5 is a flow diagram showing aspects of a routine for the disclosed techniques. Routine 500 begins at step 502, where an artifact token request 210 is received from application 106. Artifact token request 210 contains active user token 114 of user 102, application token 226 of application backend 232, scenario identifier 216, and requested operation 217 of cloud service 214.

Routine 500 then proceeds to step 504, where a determination is made whether application backend 232 is authorized to invoke operation 217 of cloud service 214 with an artifact token. This determination is made based on whether the identity of the application, the scenario the application is performing, and the requested operation are found in an entry of allow list 220.

The routine then proceeds to step 506, where permissions 116 used to access the requested operation 217 of cloud service 214 are extracted from active user token 114.

The routine then proceeds to step 508, where a determination is made whether user 102 has permission to invoke operation 217 of cloud service 214. In some configurations, this determination is made based on whether permissions 116 include permission to invoke operation 217. This determination may also be made based on a determination that application 106 itself has permission to invoke operation 217. Specifically, permissions 256 of application token 226 may be checked for permissions for application 106 to invoke operation 217. Authorization module 212 may also check allow list 220 for an allow list item 224 indicating that the application 106 may access operation 217 while performing a particular scenario.

The routine then proceeds to step 510, where artifact token 218 is generated from extracted permissions 116. Artifact token 218 may also include authenticated identity 117 of user 102. In some configurations, artifact token 218 includes restrictions, such as a restriction to use by a particular application 232, by a particular application 232 in the context of a particular scenario such as meeting 204, for particular ranges of dates/times, etc.

The routine then proceeds to step 512, where authorization module 212 of cloud service 214 provides artifact token 218 directly to application backend 232. Application backend 232 may then store artifact token 218 until using it to access requested operation 217. Step 512 may be taken in addition to or to the exclusion of step 514.

The routine then proceeds to step 514, where artifact token response 211 is returned to application 106. Artifact token response 211 may include artifact token 218. In some configurations, application 106 may later use artifact token 218 to access requested operation 217 of cloud service 214. In other scenarios, application 106 may forward artifact token 218 to application backend 232. Step 514 may be taken in addition to or to the exclusion of step 512.

The routine then proceeds to step 516, where cloud service authorization request 422 is received from application backend 232. Step 516 may occur at some indefinite time after artifact token 218 was created and returned. Cloud service authorization request 422 may include operation identifier 415, artifact token 218, application token 426 or an application identifier 257, and scenario identifier 416.

The routine then proceeds to step 518, where allow list 220 is used to verify that artifact token 218 as received in cloud service authorization request 422 is authorized to invoke the cloud service operation identified by operation identifier 415. In particular, the application token 426 and scenario identifier 416 may be used to search allow list 220 to verify that the scenario performed by the application is authorized to access the operation 415 on behalf of user 102.

The routine then proceeds to step 520, where an authorization token 426 is provided to application backend 232 including authorization token 426. Application backend 232 may provide authorization token 426 when invoking operation 415 in order to be granted access.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Although FIG. 5 refers to the components depicted in the present application, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules.

Figure 6:
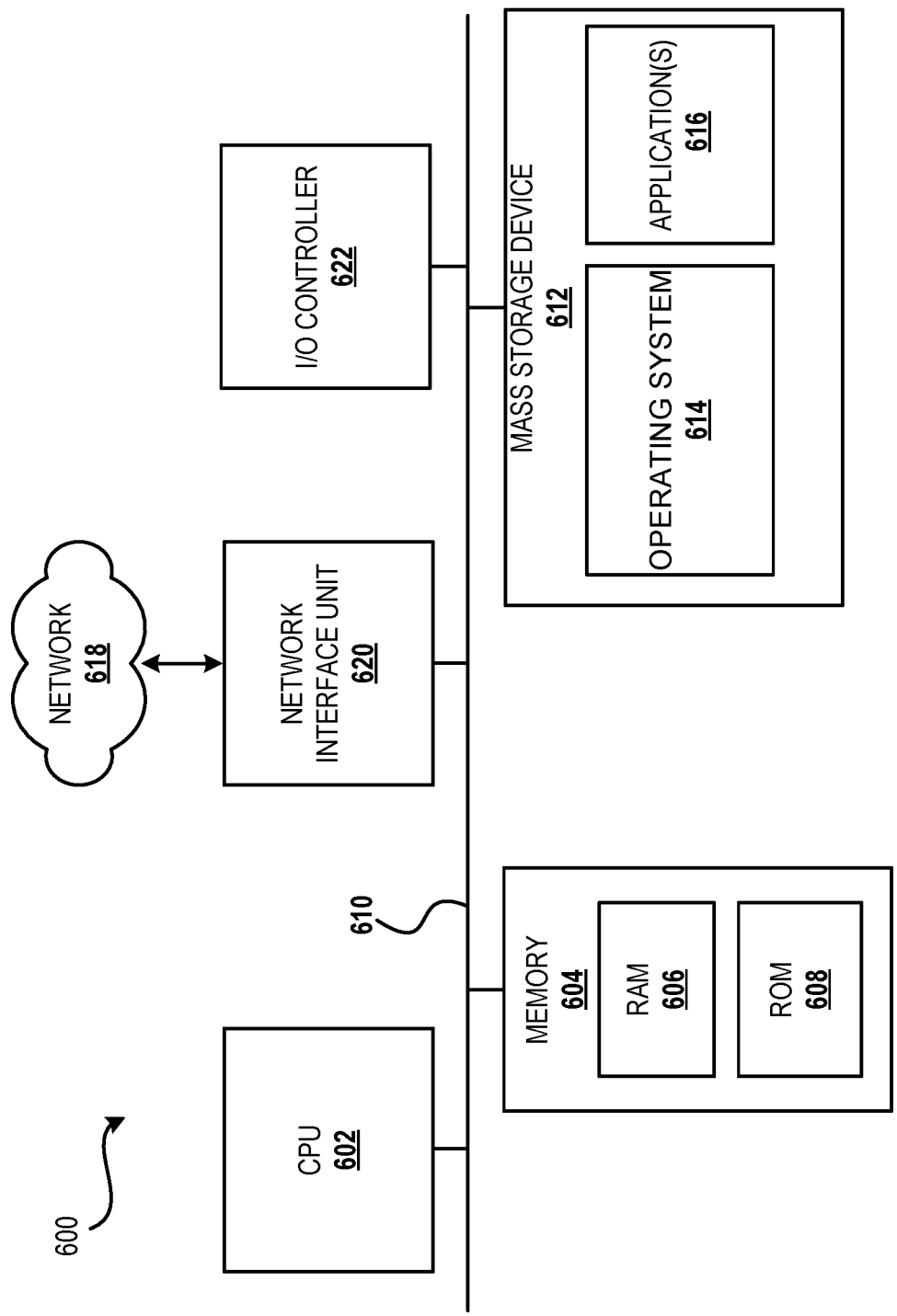
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such a cloud server that implements cloud service 214, capable of executing computer instructions (e.g., a module or a program component described herein). The computer architecture 600 illustrated in FIG. 6 includes processing unit(s) 602, a system memory 604, including a random-access memory 606 ("RAM") and a read-only memory ("ROM") 608, and a system bus 610 that couples the memory 604 to the processing unit(s) 602.

Processing unit(s), such as processing unit(s) 602, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616 (e.g., application 106, application backend 232), and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 618. The computer architecture 600 may connect to the network 618 through a network interface unit 620 connected to the bus 610. The computer architecture 600 also may include an input/output controller 622 for receiving and processing input from a number of other devices, including a keyboard, mouse, touch, or electronic stylus or pen. Similarly, the input/output controller 622 may provide output to a display screen, speaker, or other type of output device.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 602 transition between states, thereby transforming the transistors or other discrete hardware elements constituting the processing unit(s) 602.

The present disclosure is supplemented by the following example clauses.

Clause 1: A method for authorizing access to a cloud service (214), comprising: receiving an artifact token generation request (210) that includes an active user token (114), an application identifier (257) of an application (232), and an operation identifier (217) of an operation (213) of a cloud service (214); verifying that the application (232) has permission to access the operation (213) of the cloud service (214) by determining that an allow-list (220) includes an allow list item (224) that includes the operation identifier (217) and the application identifier (257); extracting, from the active user token (114), a permission (116) to invoke the operation (213) of the cloud service (214); generating an artifact token (218) in part from the extracted permission (116); providing the artifact token (218) to the application (232); receiving, from the application (232), an authorization request (422) for the operation (213) of the cloud service (214), the authorization request (422) including the artifact token (218); verifying that the cloud-hosted collaboration application (232) has permission to access the operation (213) of the cloud storage service (214) while performing the scenario based on the extracted permission (116) stored in the artifact token (218); and providing an authorization token (426) usable by the application (232) to invoke the operation (213) of the cloud service (214).

Clause 2: The method of clause 1, further comprising: determining that the artifact token includes permissions that allow the application to invoke the operation of the cloud service.

Clause 3: The method of clause 1, wherein the artifact token includes an intersection of permissions included in the active user token and permissions included in an application token of the application.

Clause 4: The method of clause 1, wherein the artifact token generation request includes a scenario identifier of an application scenario.

Clause 5: The method of clause 4, further comprising: verifying that the scenario identifier is included in the allow list item.

Clause 6: The method of clause 1, wherein the active user token was obtained by the application from an authentication server.

Clause 7: The method of clause 1, further comprising: receiving a cloud-service invocation request that includes the authorization token; and executing the operation of the cloud-service.

Clause 8: A device comprising: one or more processors; and a computer-readable storage medium having encoded thereon computer-executable instructions that cause the one or more processors to: receive an artifact token generation request (210) that includes an active user token (114), an application identifier (257) of a cloud-hosted application (232), an operation identifier (217) of an operation (213) of a cloud service (214), and a scenario identifier (216) of a scenario under which the cloud-hosted application (232) will invoke the operation (213); verify that the application (232) has permission to access the operation (213) of the cloud service (214) by determining that an allow-list (220) includes an allow list item (224) that includes the operation identifier (217), the application identifier (257), and the scenario identifier (216); extract, from the active user token (114), a permission (116) to invoke the operation (213) of the cloud service (214); generate an artifact token (218) in part from the extracted permission (116); provide the artifact token (218) to the cloud-hosted application (232); receive, from the cloud-hosted application (232), an authorization request (422) for the operation (213) of the cloud service (214), the authorization request (422) including the artifact token (218), the application identifier (257), and the scenario identifier (216); verify that the cloud-hosted collaboration application (232) has permission to access the operation (213) of the cloud storage service (214) while performing the scenario based on the extracted permission (116) stored in the artifact token (218); and provide an authorization token (426) usable by the cloud-hosted application (232) to invoke the cloud service (214).

Clause 9: The device of clause 8, wherein the active user token is obtained by a client application that is associated with the cloud-hosted application.

Clause 10: The device of clause 9, wherein the client application obtains the active user token from a secure token server that authenticates a user credential.

Clause 11: The device of clause 9, wherein the cloud-hosted application receives the active user token from the client application, and wherein the client application updates the active user token stored by the cloud-hosted application with a most recently received active user token.

Clause 12: The device of clause 8, wherein the artifact token generation request is received from the cloud-hosted application, and wherein the cloud-hosted application provides the artifact token generation request in response to a user-initiated request to schedule the cloud-hosted application to perform the scenario at a time in the future.

Clause 13: The device of clause 8, wherein the cloud-hosted application provides the authorization request in response to determining that the active user token stored by the cloud-hosted application has expired.

Clause 14: The device of clause 8, wherein the cloud-hosted application is associated with an application token that includes permissions granted to the cloud-hosted application, and wherein verifying that the cloud-hosted application has permission to access the cloud service while performing the scenario further includes verifying that permissions in the application token also grant access to the cloud service.

Clause 15: A computer-readable storage medium storing instructions that, when executed by a processor, cause the processor to: receive an artifact token generation request (210) from a cloud-hosted collaboration application (232) that includes an active user token (114), an application identifier (257) of the cloud-hosted collaboration application (232), an operation identifier (217) of an operation (213) of a cloud storage service (214), and a scenario identifier (216) of a scenario under which the cloud-hosted collaboration application (232) will invoke the operation (213) of the cloud storage service (214); verify that the application (232) has permission to access the operation (213) of the cloud service (214) by determining that an allow-list (220) includes an allow list item (224) that includes the operation identifier (217), the application identifier (257), and the scenario identifier (216); extract, from the active user token (114), a permission (116) to invoke the operation (213) of the cloud storage service (214); generate an artifact token (218) in part from the extracted permission (116); provide the artifact token (218) to the cloud-hosted collaboration application (232); receive, from the cloud-hosted collaboration application (232), an authorization request (422) for the operation (213) of the cloud storage service (214), the authorization request (422) including the artifact token (218), the application identifier (257), and the scenario identifier (216); verify that the cloud-hosted collaboration application (232) has permission to access the operation (213) of the cloud storage service (214) while performing the scenario based on the extracted permission (116) stored in the artifact token (218); and provide an authorization token (426) usable by the cloud-hosted collaboration application (232) to invoke the operation (213) of the cloud storage service (214).

Clause 16: The computer-readable storage medium of clause 15, wherein the scenario comprises a meeting hosted by the cloud-hosted collaboration application, and wherein the meeting is configured to automatically upload a recording of the meeting to a cloud storage folder of the cloud storage service.

Clause 17: The computer-readable storage medium of clause 16, wherein the cloud-hosted collaboration application provides the artifact token generation request in response to a user scheduling the meeting and requesting that the recording of the meeting be uploaded to the cloud storage folder.

Clause 18: The computer-readable storage medium of clause 15, wherein an authorization module of the cloud storage service generates the artifact token and verifies that the cloud-hosted collaboration application has permission to access the cloud storage service.

Clause 19: The computer-readable storage medium of clause 18, wherein the authorization module places restrictions on when the artifact token may be redeemed, which application can redeem the artifact token, or which cloud service the artifact token may be redeemed to access.

Clause 20: The computer-readable storage medium of clause 15, wherein the cloud-hosted collaboration application performs the scenario by using an artifact, wherein the artifact may comprise a feature of the cloud-hosted collaboration application, a document, a file, a meeting, a chat session, or an action performed by the cloud-hosted collaboration application.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for authorizing access to a cloud service, comprising:
   receiving an artifact token generation request that includes an active user token, an application identifier of an application, and an operation identifier of an operation of a cloud service;
   verifying that the application has permission to access the operation of the cloud service by determining that an allow-list includes an allow list item that includes the operation identifier and the application identifier;
   extracting, from the active user token, a permission to invoke the operation of the cloud service;
   generating an artifact token in part from an intersection of the extracted permission and permissions included in an application token of the application;
   providing the artifact token to the application;
   receiving, from the application, an authorization request for the operation of the cloud service, the authorization request including the artifact token;
   verifying that the application has permission to access the operation of the cloud service based on the extracted permission stored in the artifact token; and
   providing an authorization token usable by the application to invoke the operation of the cloud service.

2. The method of claim 1, further comprising:
   determining that the artifact token includes permissions that allow the application to invoke the operation of the cloud service.

3. The method of claim 1, wherein the artifact token generation request includes a scenario identifier of an application scenario.

4. The method of claim 3, further comprising:
   verifying that the scenario identifier is included in the allow list item.

5. The method of claim 1, wherein the active user token was obtained by the application from an authentication server.

6. The method of claim 1, further comprising:
   receiving a cloud-service invocation request that includes the authorization token; and
   executing the operation of the cloud-service.

7. A device comprising:
   one or more processors; and
   a computer-readable storage medium having encoded thereon computer-executable instructions that cause the one or more processors to:
      receive an artifact token generation request that includes an active user token, an application identifier of a cloud-hosted application, an operation identifier of an operation of a cloud service, and a scenario identifier of a scenario under which the cloud-hosted application will invoke the operation;
      verify that the application has permission to access the operation of the cloud service by determining that an allow-list includes an allow list item that includes the operation identifier, the application identifier, and the scenario identifier;
      extract, from the active user token, a permission to invoke the operation of the cloud service;
      generate an artifact token in part from the extracted permission;
      provide the artifact token to the cloud-hosted application;
      receive, from the cloud-hosted application, an authorization request for the operation of the cloud service, the authorization request including the artifact token, the application identifier, and the scenario identifier, wherein the cloud-hosted application provides the authorization request in response to determining that the active user token stored by the cloud-hosted application has expired;
      verify that the cloud-hosted application has permission to access the operation of the cloud service while performing the scenario based on the extracted permission stored in the artifact token; and
      provide an authorization token usable by the cloud-hosted application to invoke the operation of the cloud service.

8. The device of claim 7, wherein the active user token is obtained by a client application that is associated with the cloud-hosted application.

9. The device of claim 8, wherein the client application obtains the active user token from a secure token server that authenticates a user credential.

10. The device of claim 8, wherein the cloud-hosted application receives the active user token from the client application, and wherein the client application updates the active user token stored by the cloud-hosted application with a most recently received active user token.

11. The device of claim 7, wherein the artifact token generation request is received from the cloud-hosted application, and wherein the cloud-hosted application provides the artifact token generation request in response to a user-initiated request to schedule the cloud-hosted application to perform the scenario at a time in the future.

12. The device of claim 7, wherein the cloud-hosted application is associated with an application token that includes permissions granted to the cloud-hosted application, and wherein verifying that the cloud-hosted application has permission to access the cloud service while performing the scenario further includes verifying that permissions in the application token also grant access to the cloud service.

13. A computer-readable storage medium storing instructions that, when executed by a processor, cause the processor to:
   receive an artifact token generation request from a cloud-hosted collaboration application that includes an active user token, an application identifier of the cloud-hosted collaboration application, an operation identifier of an operation of a cloud storage service, and a scenario identifier of a scenario under which the cloud-hosted collaboration application will invoke the operation of the cloud storage service;

verify that the application has permission to access the operation of the cloud service by determining that an allow-list includes an allow list item that includes the operation identifier, the application identifier, and the scenario identifier;

extract, from the active user token, a permission to invoke the operation of the cloud storage service;

generate an artifact token in part from the extracted permission;

provide the artifact token to the cloud-hosted collaboration application;

receive, from the cloud-hosted collaboration application, an authorization request for the operation of the cloud storage service, the authorization request including the artifact token, the application identifier, and the scenario identifier;

verify that the cloud-hosted collaboration application has permission to access the operation of the cloud storage service while performing the scenario based on the extracted permission stored in the artifact token; and provide an authorization token usable by the cloud-hosted collaboration application to invoke the operation of the cloud storage service.

14. The computer-readable storage medium of claim 13, wherein the scenario comprises a meeting hosted by the cloud-hosted collaboration application, and wherein the meeting is configured to automatically upload a recording of the meeting to a cloud storage folder of the cloud storage service.

15. The computer-readable storage medium of claim 14, wherein the cloud-hosted collaboration application provides the artifact token generation request in response to a user scheduling the meeting and requesting that the recording of the meeting be uploaded to the cloud storage folder.

16. The computer-readable storage medium of claim 13, wherein an authorization module of the cloud storage service generates the artifact token and verifies that the cloud-hosted collaboration application has permission to access the cloud storage service.

17. The computer-readable storage medium of claim 16, wherein the authorization module places restrictions on when the artifact token may be redeemed, which application can redeem the artifact token, or which cloud service the artifact token may be redeemed to access.

18. The computer-readable storage medium of claim 13, wherein the cloud-hosted collaboration application performs the scenario by using an artifact, wherein the artifact may comprise a feature of the cloud-hosted collaboration application, a document, a file, a meeting, a chat session, or an action performed by the cloud-hosted collaboration application.

* * * * *